(12) United States Patent
Hwang et al.

(10) Patent No.: US 7,120,849 B2
(45) Date of Patent: Oct. 10, 2006

(54) DATA STORAGE MEDIUM HAVING LINK ZONE AND APPARATUS AND METHOD FOR RECORDING/REPRODUCING DATA ON/FROM THE DATA STORAGE MEDIUM

(75) Inventors: Sung-hee Hwang, Seoul (KR); Kyung-geun Lee, Gyeonggi-do (KR); Jung-wan Ko, Gyeonggi-do (KR); In-sik Park, Gyeonggi-do (KR); Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 10/384,064

(22) Filed: Mar. 10, 2003

(65) Prior Publication Data

US 2004/0088632 A1 May 6, 2004

(30) Foreign Application Priority Data

| Nov. 5, 2002 | (KR) | 10-2002-0068231 |
| Dec. 2, 2002 | (KR) | 10-2002-0076044 |
| Jan. 14, 2003 | (KR) | 10-2003-0002510 |

(51) Int. Cl.
*H03M 13/00* (2006.01)

(52) U.S. Cl. ........... 714/752; 369/275.3; 369/47.53; 369/124.07

(58) Field of Classification Search ......... 714/752, 714/756; 369/275.3, 47.5, 124.07
See application file for complete search history.

(56) References Cited

U.S. PATENT DOCUMENTS

| 5,222,086 A | 6/1993 | Fujita | |
| 5,388,093 A * | 2/1995 | Yoshida et al. | 369/124.07 |
| 5,499,224 A * | 3/1996 | Sanada | 369/47.2 |
| 5,896,351 A * | 4/1999 | Misaizu et al. | 369/30.11 |
| 6,775,721 B1 * | 8/2004 | Tran | 710/52 |
| 6,987,717 B1 * | 1/2006 | Hagiwara et al. | 369/47.53 |

FOREIGN PATENT DOCUMENTS

| JP | 10149542 | 6/1989 |
| JP | 11296996 | 10/1999 |
| JP | 2000-137948 | 5/2000 |
| JP | 2000187965 | 7/2000 |
| JP | 2000251405 | 9/2000 |

OTHER PUBLICATIONS

Hsie-Chia et al. 'A Reed-Solomon product-code (RS-PC) decoder chip for DVD applications,' IEEE Journal of Solid-State Circuits, vol. 36, Issue 2, Feb. 2001 pp. 229-238.*

* cited by examiner

*Primary Examiner*—Guy J. Lamarre
(74) *Attorney, Agent, or Firm*—Stein, McEwen & Bui, LLP

(57) ABSTRACT

A data storage medium which includes a link zone, an apparatus and a method of recording data, and an apparatus and a method of reproducing data. The data storage medium includes a plurality of ECC blocks in which user data are stored, and a plurality of link zones arranged among the ECC blocks so as to correspond to the ECC blocks, Additional information on the ECC blocks is recorded in the link zones.

62 Claims, 14 Drawing Sheets

| Frame Sync | Data Field | Address Field | Data Field | ... | Address Field | Data Field |
|---|---|---|---|---|---|---|
| Frame Sync | Data Field | Address Field | Data Field | ... | Address Field | Data Field |
| Frame Sync | Data Field | Address Field | Data Field | ... | Address Field | Data Field |
| ... | ... | ... | ... | ... | ... | ... |
| Frame Sync | Data Field | Address Field | Data Field | ... | Address Field | Data Field |

FIG. 4B

| Frame Sync | Address Field | Data Field | ... | Address Field | Data Field | ... | Address Field |
|---|---|---|---|---|---|---|---|
| Frame Sync | Address Field | Data Field | ... | Address Field | Data Field | ... | Address Field |
| Frame Sync | Address Field | Data Field | ... | Address Field | Data Field | ... | Address Field |
| ... | ... | ... | ... | ... | ... | ... | ... |
| Frame Sync | Address Field | Data Field | ... | Address Field | Data Field | ... | Address Field |

FIG. 4C

| Frame Sync | Address Field | ... | Address Field | Data Field |
| --- | --- | --- | --- | --- |
| Frame Sync | Address Field | ... | Address Field | Data Field |
| Frame Sync | Address Field | ... | Address Field | Data Field |
| ... | ... | ... | ... | ... |
| Frame Sync | Address Field | ... | Address Field | Data Field |

FIG. 8

| | Address 0 | Address 1 | | Address M−1 |
|---|---|---|---|---|
| | | Interleaving depth M | | |
| Data 5 | A00 | A01 | ... | A0(M−1) |
| | A10 | A11 | ... | A1(M−1) |
| | A20 | A21 | ⇒ RECORDING DIRECTION | A2(M−1) |
| | A30 | A31 | ... | A3(M−1) |
| | A40 | A41 | ... | A4(M−1) |
| Parity 4 | P50 | P51 | ... | P5(M−1) |
| | P60 | P61 | ... | P6(M−1) |
| | P70 | P71 | ... | P7(M−1) |
| | P80 | P81 | ... | P8(M−1) |

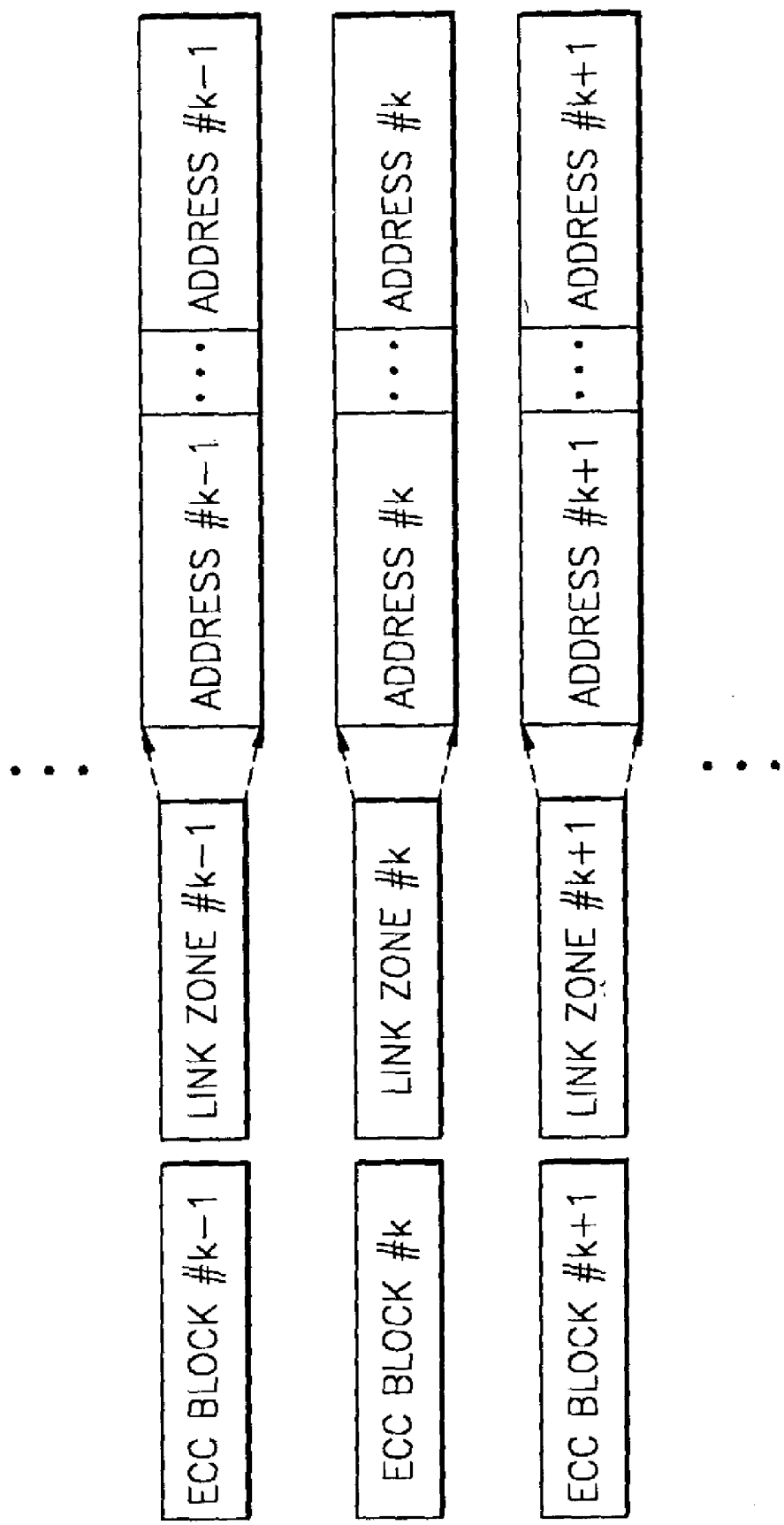

DATA STORAGE MEDIUM HAVING LINK ZONE AND APPARATUS AND METHOD FOR RECORDING/REPRODUCING DATA ON/FROM THE DATA STORAGE MEDIUM

CROSS-REFERENCE TO RELATED APPLICATIONS

This application claims the priority of Korean Patent Application Nos. 2002-68231 filed Nov. 5, 2002, 2002-76044 filed Dec. 2, 2002, and 2003-2510 filed Jan. 14, 2003, in the Korean Intellectual Property Office, the disclosures of which are incorporated herein by reference.

BACKGROUND OF THE INVENTION

1. Field of the Invention

The present invention relates to an optical disk, and more particularly, to a data storage medium having a link zone, and an apparatus and a method of recording/reproducing data on/from the data storage medium.

2. Description of the Related Art

Generally, laser beams have been widely used to record/reproduce data from optical disks. In a recordable optical disk, a zone which serves as a buffer must be defined so as to correctly read data recorded on places other than desired places and guarantee random recording and repetitive recording functions. The zone is called a run-in or run-out zone. A run-in or run-out zone is also called a link zone since it exists between regions where user data are recorded.

However, in the case of a ROM-type optical disk on which data cannot be re-recorded, the efficiency of using a recordable space is lowered where a run-in or run-out zone, i.e., a link zone is directly applied to the ROM-type optical disk to enhance the compatibility of the ROM-type optical disk with a disk drive. That is, once data are recorded on a ROM-type optical disk by a disk manufacturer during an authoring process, the ROM-type optical disk cannot be recorded on again, and accordingly, a link zone provided to repeatedly record data on a data storage medium merely occupies a recordable space on which user data can be prevented from being recorded.

SUMMARY OF THE INVENTION

Accordingly, an aspect of the present invention is to provide a data storage medium having a data structure, which can use a link zone more effectively and obtain a larger recording space while maintaining the compatibility of a recordable disk with a disk drive by defining a link zone in a ROM-type disk.

Another aspect of the present invention is to provide an apparatus and a method of recording data on the data storage medium, and an apparatus and a method of reproducing data from the data storage medium.

Additional aspects and advantages of the invention will be set forth in part in the description which follows and, in part, will be obvious from the description, or may be learned by practice of the invention.

To achieve the above and/or other aspects of the present invention, there is provided a data storage medium comprising a plurality of ECC blocks in which user data are stored, and a plurality of link zones arranged among the ECC blocks so as to correspond to the ECC blocks. In the instant data storage medium, additional information on the ECC blocks is recorded in the link zones.

Address information on the ECC blocks may be recorded in each of the link zones.

The additional information corresponding to at least one ECC block may be recorded in at least one link zone.

The additional information on the ECC blocks may be recorded a predetermined number of times in the respective link zones.

Address information corresponding to at least one ECC block may be recorded in at least one link zone.

Address information on the ECC blocks may be recorded a predetermined number of times in the respective link zones.

Each of the link zones may include at least one frame that includes at least one data field and at least one address field.

All data fields existing in the frames may define an ECC frame which is subjected to at least one of an ECC encoding and an ECC decoding.

All address fields existing in one frame may define an address frame which is subjected to at least one of an ECC encoding and an ECC decoding.

At least a part of the additional information may be located at least one time in each of the data fields.

At least part of address information corresponding to at least one ECC block may be located at least one time in each of the address fields.

The ECC frame may include as many codewords as the data fields.

The ECC frame may be a frame obtained by adding dummy data to the additional information, ECC-encoding the results of the adding, discarding the dummy data, and abandoning a part of a parity obtained through the ECC encoding.

To achieve the above and/or other aspects of the present invention, there is provided a method of recording data on a data storage medium, the method comprising providing a link zone on the data storage medium, and recording predetermined information in the link zone.

The recording of the predetermined information may include recording additional information corresponding to an ECC block of the data storage medium where user data are stored.

The providing of the link zone may comprise providing one or more link zones, and the recording of the additional information may include placing additional information corresponding to at least one ECC block in at least one link zone.

The recording of the additional information may include placing the additional information in a plurality of link zones.

The recording of the additional information may include recording at least a part of the additional information at least one time in a plurality of data fields provided in one link zone.

The recording of the additional information may include adding dummy data to data indicating the additional information and ECC-encoding the results of the adding, obtaining an ECC frame by discarding the dummy data and abandoning a part of a parity obtained through the ECC encoding, and recording the ECC frame in one link zone.

The recording of the ECC frame in the link zone may include recording the ECC frame in a direction opposite to a direction along which codewords of the ECC frame are arranged.

The recording of the ECC frame in the link zone may include recording the ECC frame in a plurality of data fields provided in one link zone in a direction opposite to a direction along which codewords of the ECC frame are arranged.

The recording of the predetermined information may include recording address information on an ECC block of the data storage medium where user data are stored.

The recording of the address information may include placing address information corresponding to at least one ECC block in the link zone.

The providing of the link zone may comprise providing a plurality of link zones, and the recording of the address information may include placing the address information in each of the link zones.

The recording of the address information may include placing at least a part of the address information at least one time in a plurality of address fields provided in the link zone.

The recording of the address information may include recording an address frame obtained through an ECC encoding in the link zone.

The recording of the address information may include recording the address frame in a direction opposite to a direction along which codewords of the address frame are arranged.

The recording of the address information may include recording the address frame in a plurality of address fields provided in the link zone in a direction opposite to a direction along which codewords of the address frame are arranged.

To achieve the above and/or other aspects of the present invention, there is provided a method of reproducing data from a data storage medium, the method comprising reading data from a link zone corresponding to an ECC block of the data storage medium where user data are stored, and obtaining at least one of additional information and address information of the link zone by ECC-decoding the read data.

The obtaining of at least one of the additional information and the address information may include adding dummy data to data of an ECC frame read from the link zone, and adding a random value as a remaining parity to a parity of the read ECC frame, where an error has occurred on the remaining parity, and performing an error correction on the ECC frame thereof.

To achieve the above and/or other aspects of the present invention, there is provided an apparatus which records data on a data storage medium, the apparatus comprising an ECC encoder which ECC-encodes additional information located in a link zone of the data storage medium corresponding to at least one ECC block of the data storage medium, and a recorder which records the ECC-encoded additional information following a way the additional information is located, in at least one link zone of the data storage medium.

The recorder may record the ECC-encoded additional information in a plurality of link zones of the data storage medium.

The recorder may record at least a part of the ECC-encoded additional information at least one time in a plurality of data fields provided in one of the link zones.

The ECC encoder may obtain an ECC frame by adding dummy data to data indicating the additional information, ECC-encoding the results of the adding, discarding the dummy data, and abandoning a part of a parity obtained through the ECC encoding, and the recorder may record the ECC frame in one link zone.

The recorder may record the ECC frame in a direction opposite to a direction along which codewords of the ECC frame are arranged.

To achieve the above and/or other aspects of the present invention, there is provided an apparatus which reproduces data from a data storage medium, the apparatus comprising a reader which reads data from a link zone corresponding to an ECC block of the data storage medium where user data are stored, and an ECC decoder which obtains at least one of additional information and address information from the link zone by ECC-decoding the read data.

The ECC decoder may perform an error correction by adding dummy data to data of an ECC frame read from the link zone and adding a random value as a remaining parity to a parity of the read ECC frame, where an error has occurred on the remaining parity.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIGS. 3A through 3C are layouts of an optical disk according to yet another embodiment of the present invention;

FIGS. 4A through 4C are diagrams illustrating a data structure of an arbitrary link zone #k shown in FIGS. 3A–3C, according to the present invention;

FIG. 8 is a diagram illustrating a data structure of an address frame of an optical disc, according to the present invention;

FIG. 9B is a diagram illustrating an arrangement of address information recorded in a link zone of an optical disc, according to the present invention;

DETAILED DESCRIPTION OF THE PREFERRED EMBODIMENTS

Figure 1:
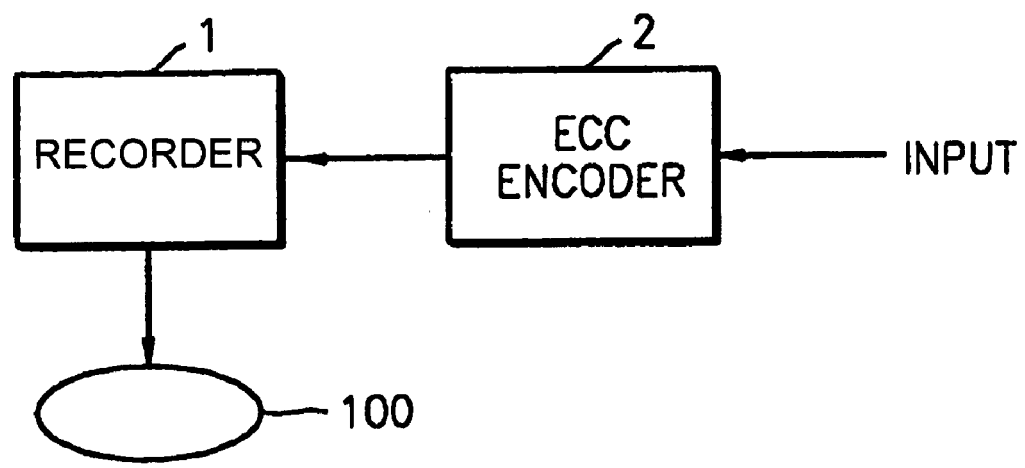
FIG. 1 is a schematic view of an apparatus which records data according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows a schematic view of an apparatus which records data according to an embodiment of the present invention. Referring to FIG. 1, the apparatus includes a recorder 1 which records predetermined information in a link zone defined on an optical disk 100 of the present invention, and an ECC encoder 2.

The ECC encoder 2 performs a first ECC encoding process on user data to be recorded on the optical disk 100 and performs a second ECC encoding process on predetermined information to be recorded in the link zone of the optical disk 100. In the first ECC encoding process, the user data are encoded under the control of a first error correction system. In the second ECC encoding process, the predetermined information to be recorded in the link zone are encoded under the control of a second error correction system. The first and second error correction systems may use the same error correction code or may perform an encoding process through the same operations.

The recorder 1 records the user data encoded by the ECC encoder 2 on the optical disk 100 and records the predetermined information encoded by the ECC encoder 2 in the link zone of the optical disk 100.

The predetermined information recorded in the link zone is classified into, for example, additional information and address information. The additional information includes copyright protection information and information on whether or not an access to a block where the user data are recorded will be allowed. The address information is, for example, position information used to record or read data.

For example, the recorder 1 records ECC-encoded additional information following a way the additional information is located, in at least one link zone of the optical disk 100. That is, additional information is recorded for a predetermined number of times, or repeatedly, by recording additional information corresponding to at least one ECC block on one link zone from the link zone's point of view, and at the same time, recording the additional information in at least one link zone from the additional information's point of view.

Figure 2:
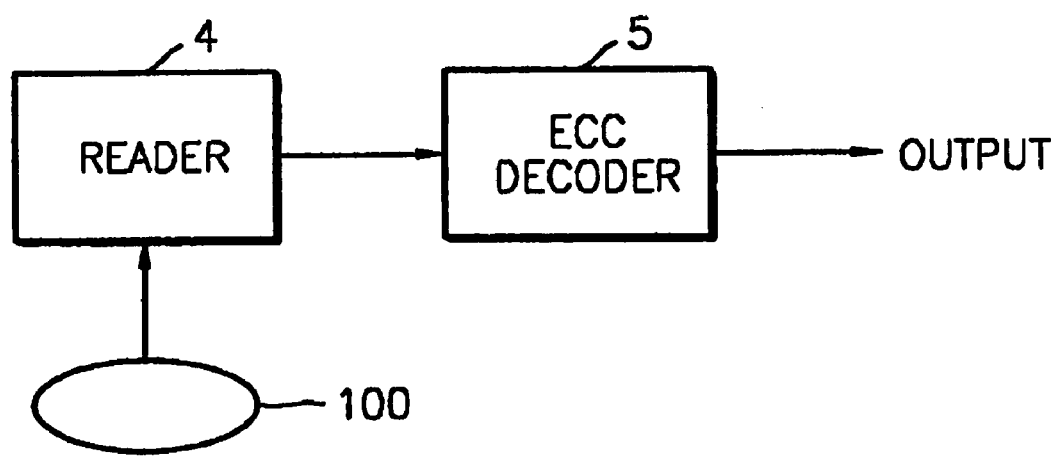
FIG. 2 is a schematic view of an apparatus which reproduces data according to another embodiment of the present invention.

FIG. 2 shows a schematic view of an apparatus which reproduces data according to another embodiment of the present invention. Referring to FIG. 2, the apparatus includes a reader 4 and an ECC decoder 5. The reader 4 reads user data from a main block or ECC blocks provided on an optical disk 100 of the present invention or reads predetermined information from a link zone of the optical disk 100, and provides the user data or the predetermined information to the ECC decoder 5. Specifically, the reader 4 reads first-ECC-encoded data from the main block or the ECC blocks and second-ECC-encoded data from the main block or a plurality of link zones arranged among the ECC blocks.

The ECC decoder 2 performs an ECC decoding process on the user data or the predetermined information provided by the reader 4 and outputs the ECC-decoded user data or the predetermined information. Specifically, the ECC decoder 2 obtains the user data by performing a first ECC decoding process on the data read from the main block or the ECC blocks, and obtains the predetermined information on the main block or the ECC blocks by performing a second ECC decoding process on the data read from the link zones. The first ECC decoding process is a process of correcting errors using a first error correction system adopted for the user data, and the second ECC decoding process is a process of correcting errors using a second error correction system adopted for the predetermined information to be recorded in the link zones. The first and second error correction systems may use the same error correction code or may perform an error correction process through the same operations.

Since the optical disk 100 of FIG. 2 has the same data structure as the optical disk 100 shown in FIG. 1, on which data have already been recorded, the optical disk 100 of FIG. 2 has the same reference numeral as the optical disk 100 of FIG. 1. In other words, the optical disk 100 of FIG. 2 has a link zone as a disk having a data structure according to the present invention, and predetermined information is recorded in the link zone.

The apparatus of FIG. 1 which records data and the apparatus of FIG. 2 which reproduces data are loaded, for example, in a disk drive.

Figures 3A, 3B, 3C:
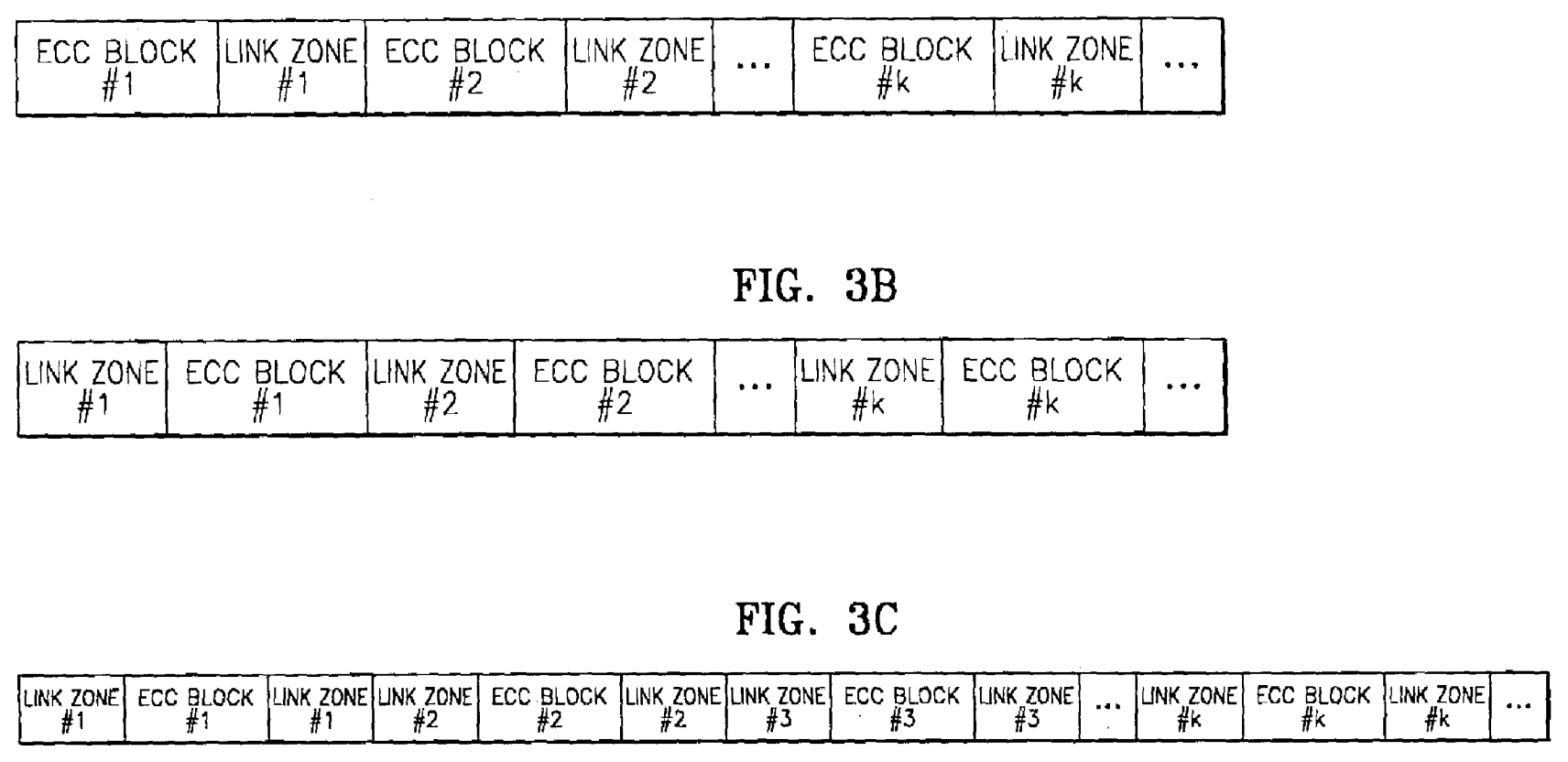

FIGS. 3A through 3C show diagrams illustrating a data structure of the optical disk 100 according to the present invention. Referring to FIG. 3A, ECC blocks and their corresponding link zones are alternately arranged on at least one recording layer (not shown) provided on the optical disk 100. In a recording space of the optical disk 100, an ECC block #1, a link zone #1 corresponding to the ECC block #1, an ECC block #2, and a link zone #2 corresponding to the ECC block #2 are sequentially arranged. An ECC block #k and its corresponding link zone #k are arranged in the same manner. User data are stored in the ECC blocks, and predetermined information according to the present invention is stored in the link zones. For example, information on the ECC block #k, which is ahead of the link zone #k, is recorded in the arbitrary link zone #k.

Referring to FIG. 3B, similarly to FIG. 3A, ECC blocks and their corresponding link zones are alternately arranged in at least one recording layer (not shown) provided on the optical disk 100. However, the order of the ECC blocks and their corresponding link zones is different. That is, a link zone and its corresponding ECC block are sequentially arranged so as to have the link zones be arranged ahead of the corresponding ECC blocks. For example, information on an ECC block #k, which is next to the link zone #k, is recorded in an arbitrary link zone #k.

Referring to FIG. 3C, in at least one recording layer (not shown) provided on the optical disk 100, an ECC block is located between its two corresponding link zones. In other words, a link zone #1, an ECC block #1, and another link zone #1 are sequentially arranged. In the same manner, a link zone #k, an ECC block #k, and another link zone #k are sequentially arranged. Hereinafter, a link zone #k may also refer to a couple of link zones corresponding to an ECC block #k arranged therebetween. For example, information on a corresponding ECC block #k, which is located ahead of or next to the link zone #k, is recorded in an arbitrary link zone #k.

FIGS. 4A through 4C show diagrams illustrating a data structure of an arbitrary link zone #k according to the present invention. Referring to FIG. 4A, a link zone #k includes a plurality of frames. A frame sync, which is data used to synchronize the frames, is recorded at one end of each of the frames, and a data field and an address field are alternately arranged next to the frame sync. In this embodiment, the number of data fields is greater than the number of address fields by 1 because a data field is arranged at the other end of each of the frames.

Referring to FIG. 4B, a link zone #k includes a plurality of frames. A frame sync, which is data used to synchronize the frames, is recorded at one end of each of the frames. An address field and a data field are alternately arranged after the frame sync. The number of address fields is greater than the number of data fields by 1 because an address field is placed at the other end of each of the frames. Alternatively, after the frame sync, a data field and an address field may be alternately arranged, and this arrangement may end with an address field. In this case, the number of address fields is the same as that of data fields.

Referring to FIG. 4C, a link zone #k includes a plurality of frames. A frame sync, which is data used to synchronize the frames, is recorded at one end of each of the frames. As shown in FIG. 4C, one frame sync is followed by a plurality of address fields and a data field.

In the arrangement manners shown in FIGS. 4A and 4B, one ECC frame is obtained by, for example, adding all data recorded in at least one data field. Specifically, one ECC frame is obtained by, for example, adding all or at least a part of data recorded in a plurality of data fields existing in one frame, or by adding all or at least a part of data recorded in a plurality of data fields existing in a plurality of frames. Accordingly, the number of data fields included in one ECC frame may vary. In addition, in the arrangement manner shown in FIG. 4C, one ECC frame is obtained by, for example, adding data recorded in at least a part of a data field. In the arrangements shown in FIGS. 4A–4C, one address frame is obtained by, for example, adding all or at least a part of data recorded in a plurality of address fields existing in one frame. Here, frames are distinguished from one another based on their frame syncs.

Figure 5:
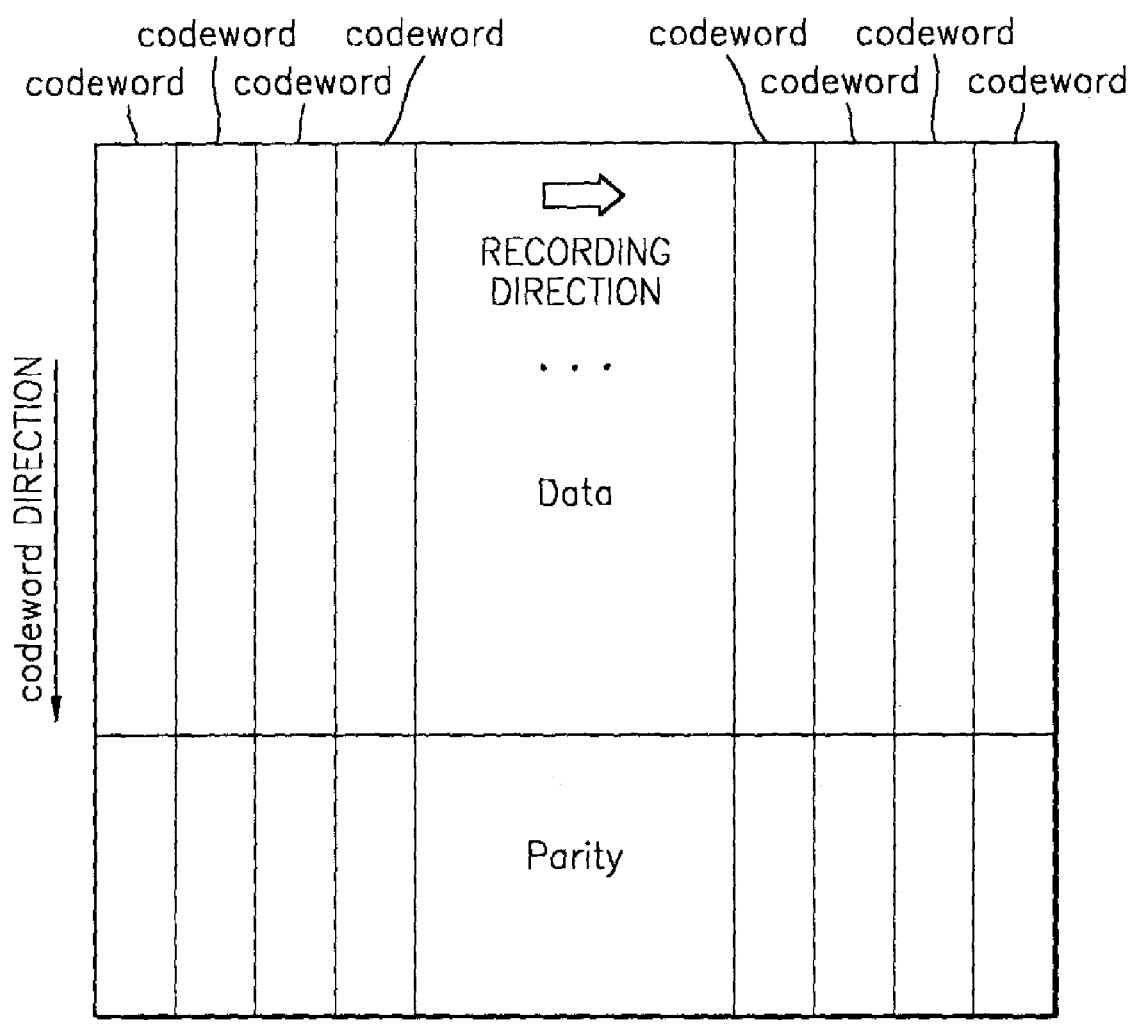
FIG. 5 is a diagram illustrating a data structure of an ECC frame of an optical disc, according to the present invention.

FIG. 5 shows a diagram illustrating a data structure of an ECC frame according to the present invention. Referring to FIG. 5, an ECC frame includes data having additional information and a parity provided for an error correction. In other words, an ECC frame comprises a plurality of codewords, and each of the codewords includes data and a parity. The number of codewords does not need to be the same as the number of data fields. That is, the order and length of data allotted to constitute a codeword may vary. Here, codewords are arranged in a column direction, and a direction of recording the codewords in a plurality of data fields is a row direction. Since the direction of the arrangement of codewords is opposite to the data recording direction, the effect of interleaving ECC frames can be provided. The depth to which the ECC frames are interleaved is, for example, the same as the number of codewords. Where the number of codewords is the same as the number of data fields, the depth to which the ECC frames are interleaved is the same as the number of data fields.

Figure 6A:
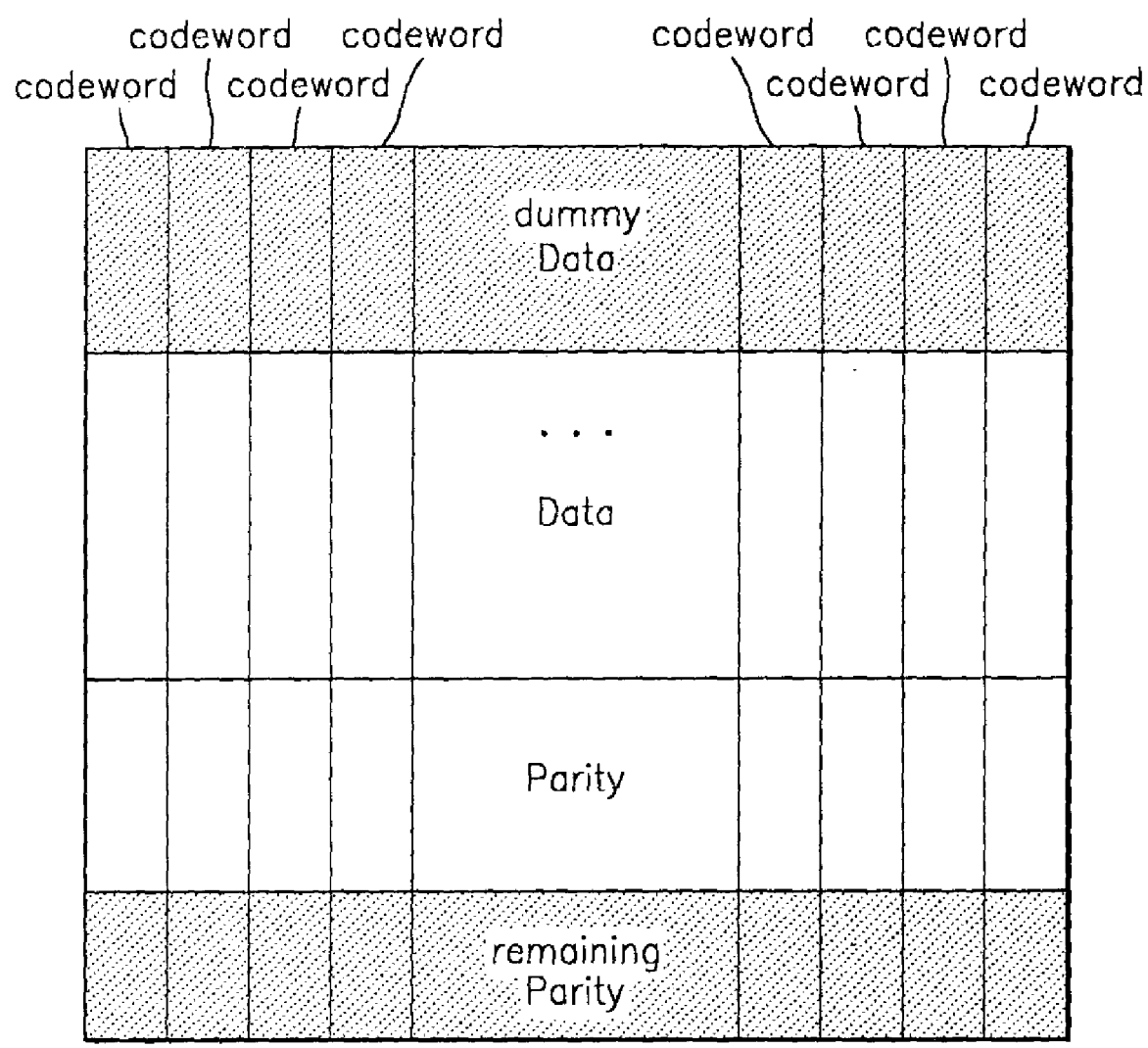
FIG. 6A is a diagram illustrating an example of a block obtained by performing a second ECC encoding on the ECC frame of FIG. 5 before recording the ECC frame of FIG. 5 on an optical disk or an example of a block used to perform a second ECC decoding on the ECC frame of FIG. 5.

FIG. 6A shows a diagram illustrating an example of a block obtained by performing a second ECC encoding on the ECC frame of FIG. 5 before recording the ECC frame of FIG. 5 on an optical disk, or an example of a block used to perform a second ECC decoding on the ECC frame of FIG. 5. Referring to FIG. 6A, to record data, predetermined dummy data are added to data indicating additional information, and an ECC encoding process is performed on the results of the adding so as to attach a parity to the data and the dummy data. A codeword obtained as a result of the ECC encoding process is a codeword following a long distance code (LDC), but may be replaced by codewords following other ECC encoding methods, including a Reed-Solomon code method.

The dummy data and a part of the parity is abandoned so that an ECC frame according to the present invention can be obtained, and the remaining ECC frame is recorded on the optical disk 100. In other words, the dummy data in the present embodiment is temporarily attached to the data for an ECC encoding rather than being recorded on the optical disk 100. Only a part of the parity is recorded on the optical disk 100, and the rest of it is abandoned. The abandoned part of the parity is called a remaining parity.

One reason why an ECC encoding is performed after adding the dummy data to the data indicating additional information, is to make data compatible with an ECC encoder to encode user data. In other words, even where the size of an ECC frame is different from that of an ECC block for user data, it is possible to perform an ECC encoding using the ECC encoder to encode user data by adding dummy data. Accordingly, there is no need to introduce another hardware.

To reproduce data, dummy data are added to data of an ECC frame shown in FIG. 5 read from the optical disk 100, and a remaining parity is added to a parity of the ECC frame. Since the dummy data are determined in advance, values of the dummy data are already known in an ECC decoding process. Random values rather than a parity, which was abandoned during a recording of data, are used as the remaining parity. In other words, the remaining parity used to decode data has a different value from the abandoned parity used to encode data. Since errors may have occurred in the parity filled with such random values, an ECC decoding process, i.e., an error correction process is performed. A process of correcting errors without knowing where the errors have occurred is an error correction process in a narrow sense, and a process of correcting errors for positions of which are already known is called an erase correction process. Accordingly, an erase correction process is performed on the remaining parity because the locations where the errors have occurred are known.

Figure 6B:
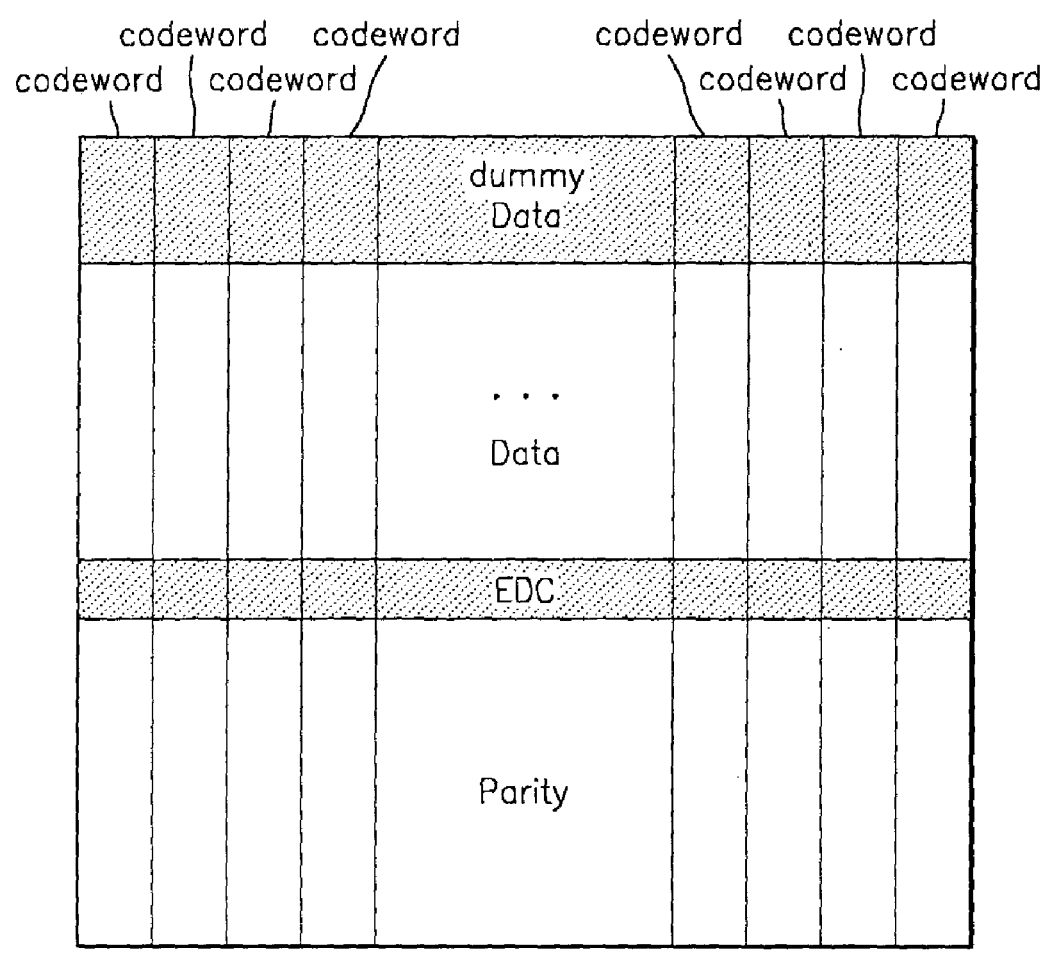
FIG. 6B is a diagram illustrating another example of a block obtained by performing a second ECC encoding on the ECC frame of FIG. 5 before recording the ECC frame of FIG. 5 on an optical disk or another example of a block used to perform a second ECC decoding on the ECC frame of FIG. 5.

FIG. 6B shows a diagram illustrating another example of a block obtained by performing a second ECC encoding on the ECC frame of FIG. 5 before recording the ECC frame of FIG. 5 on an optical disk, or another example of a block used to perform a second ECC decoding on the ECC frame of FIG. 5. Referring to FIG. 6B, to record data, predetermined dummy data are added to data indicating additional information, and an error detection code (EDC) encoding process is performed on every codeword of the results of the adding. Alternatively, the EDC encoding process is performed on every codeword of the data indicating additional information, and then the predetermined dummy data are added to the results of the EDC encoding process. In the former case, an EDC code is attached to the sum of the dummy data and the data indicating additional information. On the other hand, in the latter case, the EDC code is attached to the data indicating additional information. After the EDC encoding process is completed, in other words, after the EDC code and the dummy data are added to the data indicating additional information, an ECC encoding process is performed so that a parity is attached to the results of the EDC encoding process. A codeword obtained as a result of the ECC encoding process is a codeword following an LDC. However, the obtained codeword may be replaced by a codeword following another ECC encoding method, such as a Reed-Solomon code method. The codeword obtained as a result of a second encoding is directly recorded on the optical disk 100. In other words, in the present embodiment, the dummy data are attached to the data indicating additional information for an ECC encoding or an EDC encoding and are also recorded on the optical disk 100. The parity is also recorded on the optical disk 100 without its part abandoned.

One reason why the second ECC encoding is performed after the dummy data are added to the data indicating additional information is to make data compatible with an ECC encoder to encode user data. In other words, even where the size of an ECC frame is different from that of an ECC block for user data, it is possible to perform an ECC encoding using the ECC encoder to encode user data by adding dummy data. Accordingly, there is no need to introduce other hardware.

To reproduce data, a second ECC decoding process, i.e., an error correction process, is performed on a codeword constituting an ECC frame shown in FIG. 6B, read from the optical disk 100. Specifically, an ECC decoding process is performed on the codeword, and then an EDC decoding process is performed on the result of the ECC decoding process. Alternatively, the ECC decoding process is performed on the codeword, dummy data are separated from the result of the ECC decoding, and the EDC decoding process is performed on the result of the ECC decoding, from which the dummy data have been discarded. The former case corresponds to an ECC frame having a codeword obtained by attaching dummy data to data to be recorded, performing an EDC encoding process, and then performing an ECC encoding process. The latter case corresponds to an ECC frame having a codeword obtained by performing an EDC encoding process, attaching dummy data to data to be recorded, and performing an ECC encoding process.

It is possible to identify through an EDC decoding process whether errors have occurred in a second error correction system where an error correction is completely performed on a codeword. Generally, it is impossible to guarantee that data obtained after an error correction process is the same as original data before errors occurred. Accordingly, the reliability of data having been through error correction can be enhanced by performing an EDC encoding process on the result of the error correction.

Figure 7A:
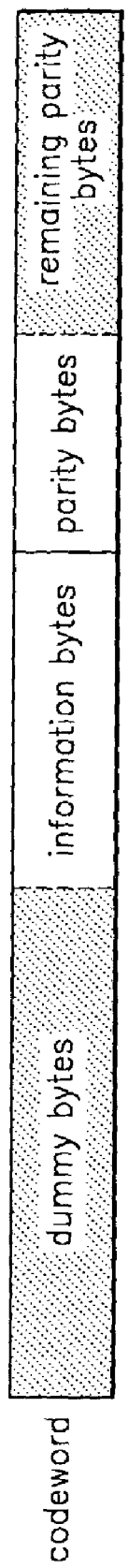
FIG. 7A is a detailed diagram of a codeword of FIG. 6A.

FIG. 7A shows a detailed diagram of a codeword shown in FIG. 6A. Referring to FIG. 7A, the codeword shown in FIG. 6A includes dummy bytes, information bytes constituting additional information, parity bytes, and remaining parity bytes. In this embodiment, the codeword is a codeword following an LDC. However, it is understood that the codeword may be replaced by a codeword following another ECC encoding method, such as a Reed-Solomon code method. As described above, the dummy bytes and the remaining parity bytes in the codeword are not data recorded on the optical disk 100, but bytes used for an ECC encoding or an ECC decoding. The information bytes and the parity bytes are bytes recorded in data fields of a link zone of the optical disk 100. For example, 32 parity bytes are obtained by performing an ECC encoding on 16 information bytes added to 200 dummy bytes. However, the 16 information bytes and the 16 parity bytes are only recorded on the optical disk 100, and the 200 dummy bytes and 16 remaining parity bytes are abandoned. In reproducing data, 16 information bytes and 16 parity bytes are read from the optical disk 100. Then 200 dummy bytes are added to the 16 information bytes and the 16 parity bytes, and an error correction process is performed after filling a codeword with, for example, random values instead of remaining parity bytes.

Figure 7B:
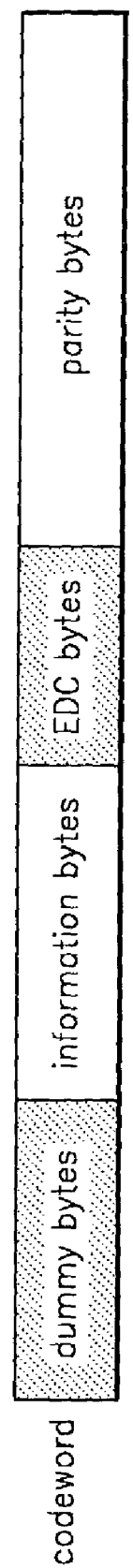
FIG. 7B is a detailed diagram of a codeword of FIG. 6B.

FIG. 7B shows a detailed diagram of a codeword shown in FIG. 6B. Referring to FIG. 7B, the codeword shown in FIG. 6B includes dummy bytes, information bytes constituting additional information, EDC bytes, and parity bytes. In this embodiment, the codeword is a codeword following an LDC. However, it is understood that the codeword may be replaced by a codeword following another ECC encoding method, such as a Reed-Solomon code method. As described above with reference to FIG. 6B, the dummy bytes and the parity bytes are all recorded on the optical disk 100. For example, 28 information bytes are added to 4 EDC bytes, and 184 dummy bytes are added to the 28 information bytes and the 4 EDC bytes. Thereafter, an ECC encoding process is performed so as to obtain 32 parity bytes.

FIG. 8 shows a diagram illustrating a data structure of an address frame according to the present invention. FIG. 8 shows an address frame having an interleaving depth of M, 5 byte-long data constituting each codeword, and 4 byte-long parity. The address frame includes data constituting address information and parity provided for error correction. In other words, the address frame comprises a plurality of address codewords, and each of the address codewords includes data and a parity. In this embodiment, the number of codewords is the same as the number of address fields. Here, codewords are arranged in a column direction, and a direction of recording the codewords in a plurality of data fields is a row direction. Since the direction of the arrangement of codewords is opposite to the data recording direction, the effect of interleaving the ECC frames can be provided. Here, an interleaving depth is the same as the number of codewords (the number of data fields), M.

An address frame, unlike an ECC frame, is ECC-encoded and ECC-decoded without dummy data being added thereto because an ECC encoder and an ECC decoder for an address frame are provided separately from an ECC encoder and an ECC decoder for user data.

Figure 9A:
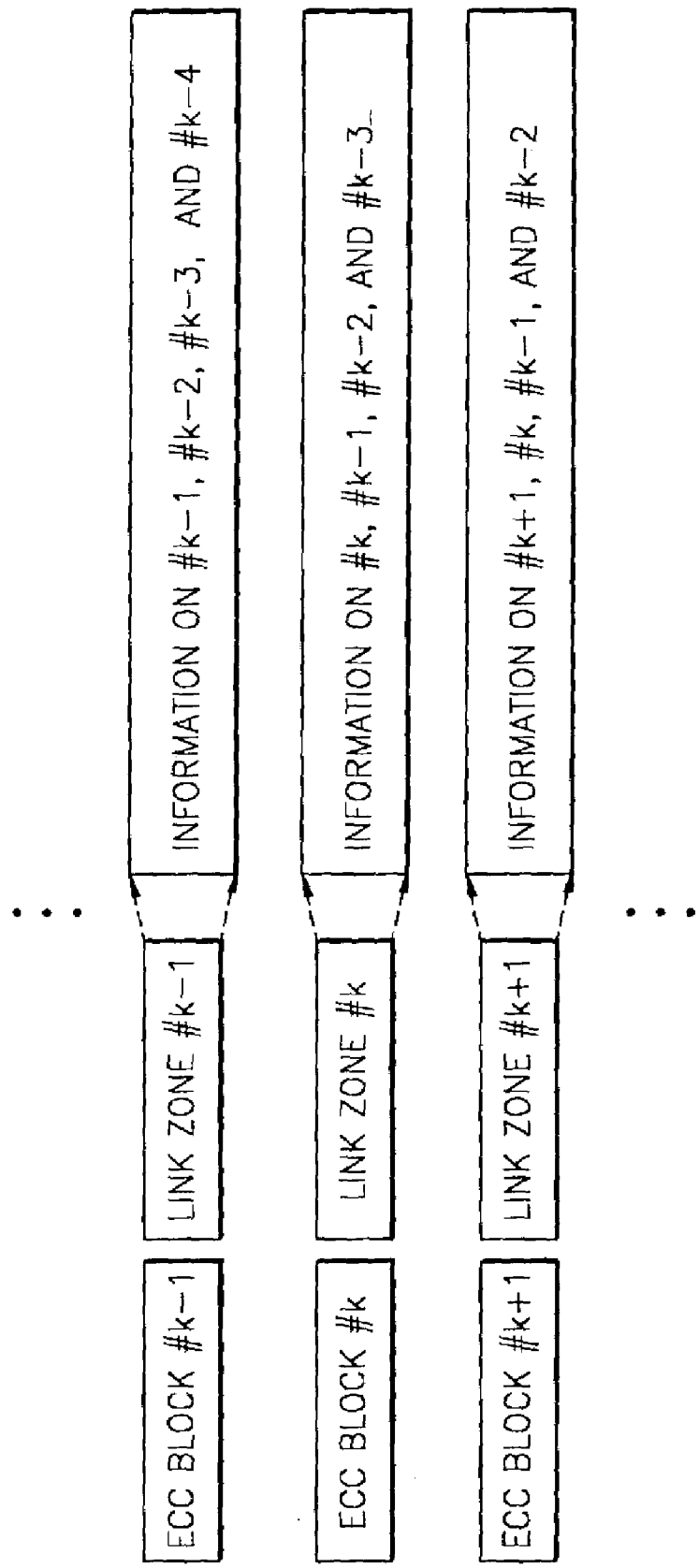
FIG. 9A is a diagram illustrating an arrangement of additional information recorded in a link zone of an optical disc, according to the present invention.

FIG. 9A shows a diagram illustrating an arrangement of additional information recorded in a link zone according to the present invention. Referring to FIG. 9A, where there are an ECC block #k, an ECC block #k±1, . . . , and their corresponding link zones #k, #k±1, . . . , information on ECC blocks #k, #k−1, #k−2, and #k−3 is recorded in a data field of a link zone #k, information on ECC blocks #k−1, #k−2, #k−3, and #k−4 is recorded in a data field of a link zone #k−1, and information on ECC blocks #k+1, #k, #k−1, and #k−2 is recorded in a data field of a link zone #k+1.

In other words, in the present embodiment, additional information on a plurality of ECC blocks is recorded in an arbitrary link zone, and additional information on an arbitrary ECC block is arranged in a plurality of link zones. Accordingly, additional information on a predetermined ECC block is repeatedly recorded in at least two different link zones so as to enhance the reliability and robustness of information.

FIG. 9B shows a diagram illustrating an arrangement of address information recorded in a link zone according to the present invention. Referring to FIG. 9B, where ECC blocks #k, #k±1, . . . , and their corresponding link zones #k, #k±1, . . . , exist, address information on an ECC block #k is recorded a predetermined number of times in an address field of a link zone #k, address information on an ECC block #k−1 is recorded a predetermined number of times in an address field of a link zone #k−1, and address information on an ECC block #k+1 is recorded a predetermined number of times in an address field of a link zone #k+1.

Where a link zone #k is located next to its corresponding ECC block #k, as shown in FIG. 3A, a plurality of addresses of an ECC block are recorded in an arbitrary link zone right ahead of the ECC block. Accordingly, an address of a following ECC block can be anticipated in advance, and thus it is possible to access ECC blocks faster.

Where a link zone #k is located ahead of its corresponding ECC block #k, as shown in FIG. 3B, a plurality of addresses of an ECC block are recorded in an arbitrary link zone next to the ECC block. Accordingly, an address of a following ECC block can be anticipated in advance, and thus it is possible to access ECC blocks faster.

Where an ECC block #k is located between its corresponding link zones #k, as shown in FIG. 3C, a plurality of addresses of an ECC block are recorded in a link zone ahead of and/or next to the ECC block. Accordingly, an address of a following ECC block can be anticipated in advance, and thus it is possible to access ECC blocks faster.

In other words, in the present embodiment, address information on an ECC block may be recorded a predetermined number of times in a link zone corresponding to the ECC block so as to enhance the reliability and robustness of the address information can be enhanced.

Figure 10A:
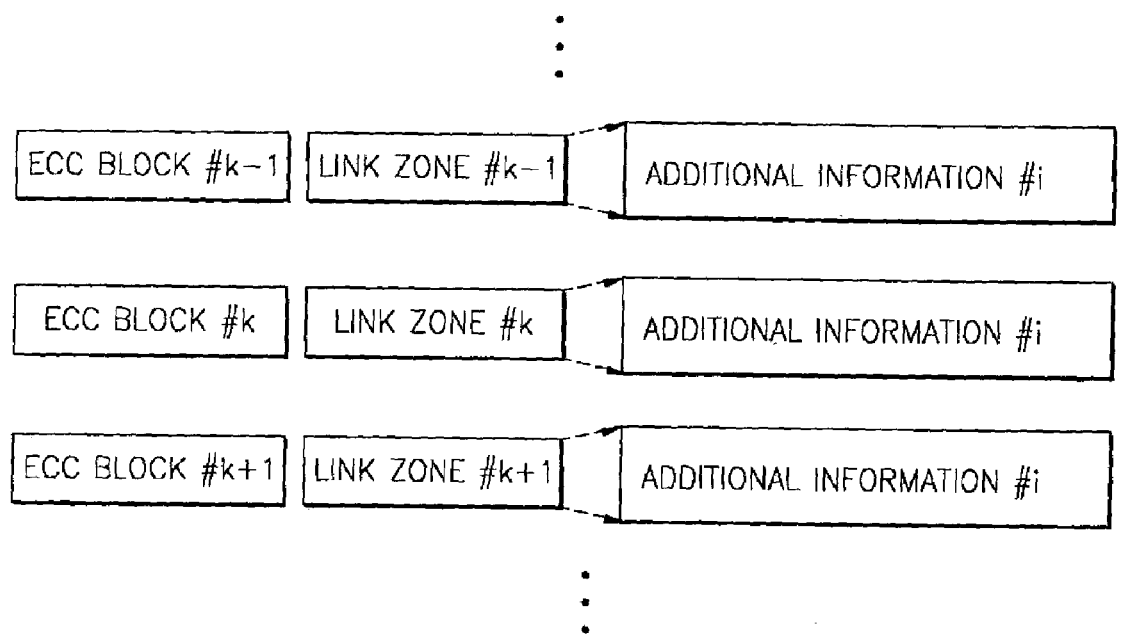
FIG. 10A is a diagram illustrating another arrangement of additional information recorded in a link zone of an optical disc, according to the present invention.

FIG. 10A shows a diagram illustrating another arrangement of additional information recorded in a link zone according to the present invention. Referring to FIG. 10A, where ECC blocks #k, #k±1, . . . , and their corresponding link zones #k, #k±1, . . . , exist, arbitrary additional information #i is recorded in data fields of at least one link zone. In the embodiment of FIG. 10A, the additional information #I is recorded in the link zones #k−1, #k, and #k+1. In each link zone, there are a plurality of data fields, and thus the additional information #i can be recorded at least one time in each of the data fields. The reliability and robustness of information can be enhanced by repeatedly recording the information in link zones.

In other words, in this embodiment, additional information corresponding to a plurality of ECC blocks is recorded at least one time in link zones corresponding to the ECC blocks. A method of arranging additional information in a link zone is appropriate for the case of recording information indicating whether or not a limited access to some ECC blocks will be allowed, where, for example, contents inappropriate for minors are recorded, or the case of recording a password as additional information in a business model where a promotion disk is provided to people for free and some ECC blocks can be viewed for free but the other ECC blocks can only be viewed after, for example, accessing a predetermined website and inputting a password obtained in exchange for payment.

In addition, additional information #k on an ECC block #k is recorded in a link zone #k. Likewise, the additional information #k can also be repeatedly recorded one time in each of a plurality of data fields existing in the link zone #k.

Figure 10B:
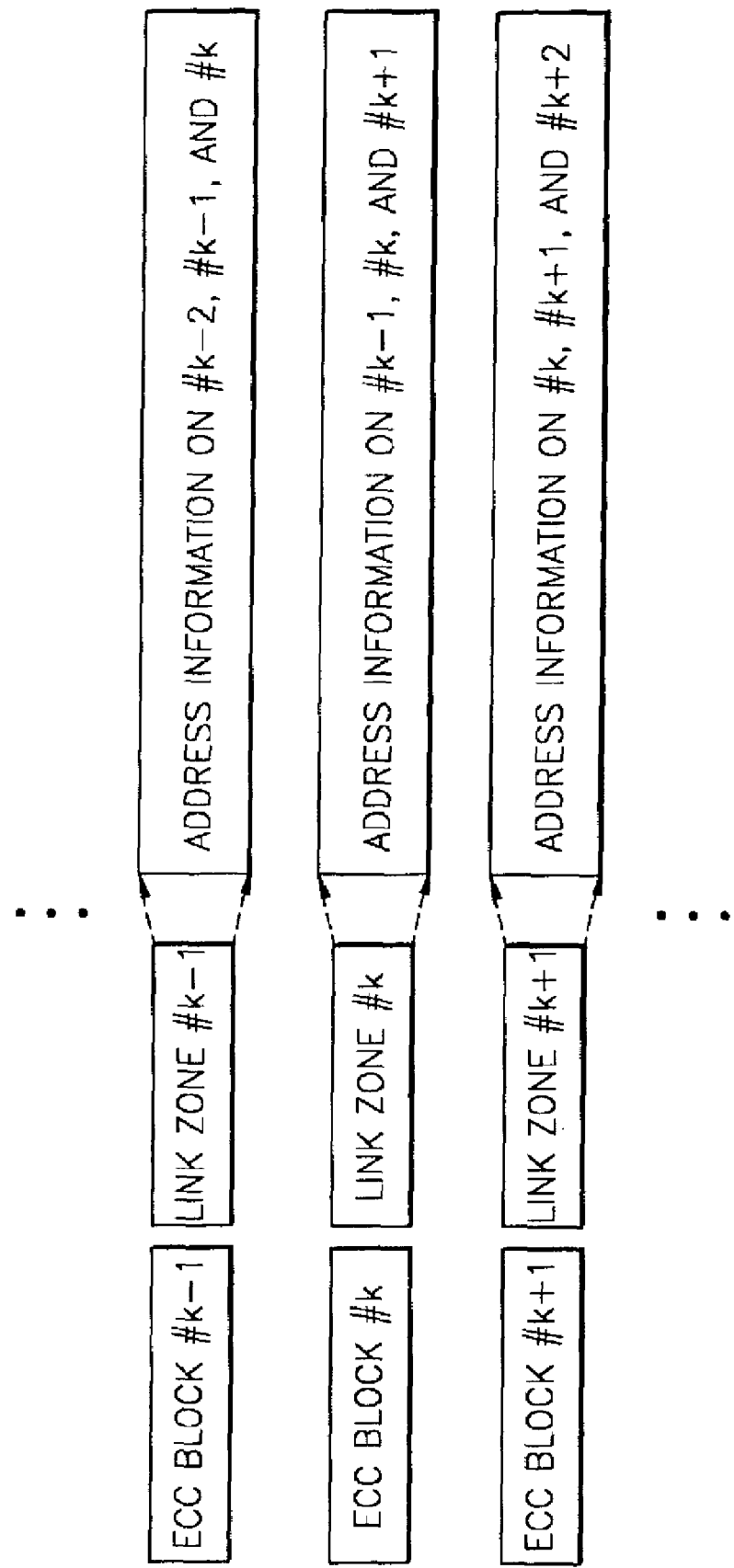
FIG. 10B is a diagram illustrating another arrangement of address information recorded in a link zone of an optical disc, according to the present invention.

FIG. 10B shows a diagram illustrating another arrangement of address information recorded in a link zone according to the present invention. Referring to FIG. 10B, where ECC blocks #k, #k±1, . . . , and their corresponding link zones #k, #k±1, . . . , exist, address information on ECC blocks #k−1, #k, and #k+1 is recorded in an address field of a link zone #k, address information on ECC blocks #k−2, #k−1, and #k is recorded in an address field of a link zone #k−1, and address information on ECC blocks #k, #k+1, and #k+2 is recorded in an address field of a link zone #k+1.

In other words, in the present embodiment, at least a part of address information on a plurality of ECC blocks is recorded in an arbitrary link zone, and address information on an arbitrary ECC block is arranged in a plurality of link zones. Accordingly, address information on a predetermined ECC block is recorded in at least two different link zones so as to enhance the reliability and robustness of information even further.

As described above, according to the present invention, a ROM-type disk can have a data structure enabling more effective use of a link zone in terms of obtaining a larger recording space while maintaining its compatibility with a recordable disk drive by defining the link zone. In addition, an error correction system is introduced so as to enhance the reliability of information stored in a link zone, and information is repeatedly recorded in a link zone so as to reproduce the information irrespective of errors, such as finger prints or scratches. Moreover, it is possible to record address information on an ECC block in a link zone and make use of the address information.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A data storage medium comprising:
   a plurality of ECC blocks in which user data are stored; and
   a plurality of link zones arranged among the ECC blocks so as to correspond to the ECC blocks, wherein additional information on the ECC blocks is recorded in the link zones.

2. The data storage medium of claim 1, wherein address information on the ECC blocks is recorded in each of the link zones.

3. The data storage medium of claim 1, wherein the additional information corresponding to at least one ECC block is recorded in at least one link zone.

4. The data storage medium of claim 1, wherein the additional information on the ECC blocks is recorded a predetermined number of times in the respective link zones.

5. The data storage medium of claim 1, wherein address information corresponding to at least one ECC block is recorded in at least one link zone.

6. The data storage medium of claim 5, wherein:
   the link zones include an address frame comprising codewords,
   each of the codewords includes data of the address information and a parity that is used to perform an error correction of the data storage medium.

7. The data storage medium of claim 1, wherein address information on the ECC blocks is recorded a predetermined number of times in the respective link zones.

8. The data storage medium of claim 1, wherein each of the link zones includes at least one frame that includes at least one data field and at least one address field.

9. The data storage medium of claim 8, wherein all data fields existing in the frames defines an ECC frame which is subjected to at least one of an ECC encoding and an ECC decoding.

10. The data storage medium of claim 9, wherein the ECC frame includes as many codewords as the data fields.

11. The data storage medium of claim 9, wherein the ECC frame is a frame obtained by adding dummy data to the additional information, ECC-encoding the results of the adding, discarding the dummy data, and abandoning a part of a parity obtained through the ECC encoding.

12. The data storage medium of claim 8, wherein all address fields existing in one frame defines an address frame which is subjected to at least one of an ECC encoding and an ECC decoding.

13. The data storage medium of claim 8, wherein at least a part of the additional information is located at least one time in each of the data fields.

14. The data storage medium of claim 8, wherein at least a part of address information corresponding to at least one ECC block is located at least one time in each of the address fields.

15. The data storage medium of claim 1, wherein address information on one of the ECC blocks is recorded a predetermined number of times in one of the link zones corresponding to the one ECC block.

16. The data storage medium of claim 1, wherein at least a part of address information on ECC blocks is recorded in one of the link zones.

17. The data storage medium of claim 1, wherein address information on one of the ECC block is arranged in at least two of the link zones.

18. The data storage medium of claim 1, wherein:
the ECC blocks include k−1, k, and k+1 ECC blocks, and
the link zones include k−1, k, and k+1 link zones which correspond to the k−1, k, and k+1 ECC blocks, respectively, wherein the k link zone includes address information on the k−1, k, and k+1 ECC blocks.

19. The data storage medium of claim 1, wherein the additional information on one of the ECC blocks is recorded a predetermined number of times in one of the link zones corresponding to the one ECC block.

20. The data storage medium of claim 1, wherein at least a part of the additional information on ECC blocks is recorded in one of the link zones.

21. The data storage medium of claim 1, wherein the additional information on one of the ECC block is arranged in at least two of the link zones.

22. The data storage medium of claim 1, wherein:
the ECC blocks include k−1, k, and k+1 ECC blocks, and
the link zones include k−1, k, and k+1 link zones which correspond to the k−1, k, and k+1 ECC blocks, respectively, wherein the k link zone includes the additional information on the k−1, k, and k+1 ECC blocks.

23. The data storage medium of claim 1, wherein one of the link zones contains information on one of the ECC blocks, and the one ECC block is arranged ahead of or behind the one link zone, among the arrangements of the link zones and the ECC blocks.

24. The data storage medium of claim 1, wherein two of the link zones contain information on one of the ECC blocks, and the one ECC block is arranged in between the two link zones among the arrangements of the link zones and the ECC blocks.

25. The data storage medium of claim 1, wherein:
each of the link zones includes a plurality of frames, and
each of the frames includes at least one data field, at least one address field, and a synchronization frame which is used to synchronize the frames corresponding to one of the link zones.

26. The data storage medium of claim 1, wherein:
each of the link zones includes frames,
each of the frames includes data fields and address fields, and
all data recorded in at least one data field defines an ECC frame which is subjected to at least one of an ECC encoding and an ECC decoding.

27. The data storage medium of claim 1, wherein:
each of the link zones includes one or more frames,
each of the frames includes data fields and address fields, and
all or at least a part of data recorded in a plurality of data fields existing in one frame or existing in a plurality of frames defines an ECC frame, which is subjected to at least one of an ECC encoding and an ECC decoding.

28. The data storage medium of claim 1, wherein:
each of the link zones includes one or more frames,
each of the frames includes data fields and an address field, and
data recorded in at least a part of one data field defines an ECC frame which is subjected to at least one of an ECC encoding and an ECC decoding.

29. The data storage medium of claim 1, wherein:
each of the link zones includes one or more frames,
each of the frames includes data fields and address fields, and
all or at least a part of data recorded in a plurality of address fields existing in one frame defines an address frame, which is subjected to at least one of an ECC encoding and an ECC decoding.

30. The data storage medium of claim 1, wherein:
the link zones include an ECC frame comprising codewords,
each of the codewords includes data of the additional information and a parity that is used to perform an error correction of the data storage medium.

31. The data storage medium of claim 1, wherein the data storage medium is a ROM-type disc.

32. A method of recording data on a data storage medium, the method comprising:
providing one or more link zones arranged among ECC blocks in which user data are stored on a recording layer of the data storage medium; and
recording predetermined information in the one or more link zones.

33. The method of claim 32, wherein the recording of the predetermined information comprises recording additional information corresponding to an ECC block of the data storage medium where user data are stored.

34. The method of claim 33, wherein:
the recording of the additional information comprises placing additional information corresponding to at least one ECC block in at least one link zone.

35. The method of claim 34, wherein the recording of the additional information comprises placing the additional information in a plurality of link zones.

36. The method of claim 34, wherein the recording of the additional information comprises recording at least a part of the additional information at least one time in a plurality of data fields provided in one link zone.

37. The method of claim 34, wherein the recording of the additional information comprises:
adding dummy data to data indicating the additional information and ECC-encoding the results of the adding;
obtaining an ECC frame by discarding the dummy data and abandoning a part of a parity obtained through the ECC encoding; and
recording the ECC frame in one link zone.

38. The method of claim 37, wherein the recording of the ECC frame in the link zone comprises recording the ECC frame in a direction opposite to a direction along which codewords of the ECC frame are arranged.

39. The method of claim 37, wherein the recording of the ECC frame in the link zone comprises recording the ECC frame in a plurality of data fields provided in one link zone in a direction opposite to a direction along which codewords of the ECC frame are arranged.

40. The method of claim 32, wherein the recording of the predetermined information comprises recording address information on an ECC block of the data storage medium where user data are stored.

41. The method of claim 40, wherein the recording of the address information comprises placing address information corresponding to at least one ECC block in the link zone.

42. The method of claim 40, wherein:
the recording of the address information comprises placing the address information in each of the link zones.

43. The method of claim 40, wherein the recording of the address information comprises placing at least a part of the address information at least one time in a plurality of address fields provided in the link zone.

44. The method of claim 40, wherein the recording of the address information comprises recording an address frame obtained through an ECC encoding in the link zone.

45. The method of claim 44, wherein the recording of the address information comprises recording the address frame in a direction opposite to a direction along which codewords of the address frame are arranged.

46. The method of claim 44, wherein the recording of the address information comprises recording the address frame in a plurality of address fields provided in the link zone in a direction opposite to a direction along which codewords of the address frame are arranged.

47. The method of claim 34, wherein the recording of the additional information comprises:
adding dummy data to data of the additional information and EDC-encoding every codeword of the result of the adding;
obtaining a codeword by ECC encoding the result of the EDC-encoding; and
recording the codeword on the link zone.

48. The method of claim 34, wherein the recording of the additional information comprises:
EDC encoding every codeword of data of the additional information;
adding dummy data to the result of the EDC encoding of the data;
obtaining a codeword by ECC encoding the result of the adding; and
recording the codeword on the link zone.

49. A method for reproducing data from a data storage medium, the method comprising:
reading data from a link zone arranged among ECC blocks where user data are stored on a recording layer of the data storage medium; and
obtaining at least one of address information and additional information from the link zone by ECC-decoding the read data.

50. The method of claim 49, wherein the obtaining of at least one of the address information and the additional information includes:
adding dummy data to data of an ECC frame read from the link zone; and
adding a random value as a remaining parity to a parity of the read ECC frame, where an error has occurred on the remaining parity, and performing error correction on the ECC frame thereof.

51. The method of claim 49, wherein the obtaining of at least one of the address information and the additional information includes:
adding dummy data to data of an ECC frame read from the link zone; and
adding a random value as a remaining parity to a parity of the read ECC frame, and performing an erase correction on the remaining parity.

52. The method of claim 49, wherein the obtaining of at least one of the address information and the additional information includes:
ECC decoding a codeword read from the link zone; and
EDC decoding the result of the ECC decoding.

53. The method of claim 49, wherein the obtaining of at least one of the address information and the additional information includes:
separating dummy data from a codeword read from the link zone by ECC decoding the codeword; and
EDC decoding the result of the ECC decoding.

54. An apparatus which records data on a data storage medium, the apparatus comprising:
an ECC encoder which ECC-encodes additional information located in a link zone arranged among ECC blocks where user data are stored on a recording layer of the data storage medium; and
a recorder which records the ECC-encoded additional information following a way the additional information is located, in at least one link zone of the data storage medium.

55. The apparatus of claim 54, wherein the recorder records the ECC-encoded additional information in a plurality of link zones of the data storage medium.

56. The apparatus of claim 55, wherein the recorder records at least a part of the ECC-encoded additional information at least one time in a plurality of data fields provided in one of the link zones.

57. The apparatus of claim 54, wherein:
the ECC encoder obtains an ECC frame by adding dummy data to data indicating the additional information, ECC-encoding the results of the adding, discarding the dummy data, and abandoning a part of a parity obtained through the ECC encoding, and
the recorder records the ECC frame in one link zone.

58. The apparatus of claim 57, wherein the recorder records the ECC frame in a direction opposite to a direction along which codewords of the ECC frame are arranged.

59. The apparatus of claim 54, wherein the recorder records, for a predetermined number of times, the ECC-encoded additional information in at least one link zone of the data storage medium.

60. The apparatus of claim 54, wherein the recorder repeatedly records the ECC-encoded additional information by recording the ECC-encoded additional information on one link zone from the link zone's point of view, and at the same time, recording the additional information in at least one link zone from the additional information's point of view.

61. An apparatus which reproduces data on a data storage medium, the apparatus comprising:
a reader which reads data from a link zone arranged among ECC blocks where user data are stored on a recording layer of the data storage medium; and
an ECC decoder which obtains at least one of address information and additional information from the link zone by ECC-decoding the read data.

62. The apparatus of claim 61, wherein the ECC decoder performs an error correction by adding dummy data to data of an ECC frame read from the link zone and adding a random value as a remaining parity to a parity of the read ECC frame, where an error has occurred on the remaining parity.

* * * * *